United States Patent
Kindler et al.

(10) Patent No.: US 10,998,959 B2
(45) Date of Patent: May 4, 2021

(54) SYSTEM, METHOD AND APPARATUS FOR AN UPLINK EXTENDER

(71) Applicant: Lantiq Beteiligungs-GmbH & Co. KG, Neubiberg (DE)

(72) Inventors: Matthias Kindler, Neubiberg (DE); Haribalaraman Ramasubramanian, Bangalore (IN)

(*) Notice: Subject to any disclaimer, the term of this patent is extended or adjusted under 35 U.S.C. 154(b) by 903 days.

(21) Appl. No.: 14/762,476

(22) PCT Filed: Feb. 4, 2014

(86) PCT No.: PCT/EP2014/052126
§ 371 (c)(1),
(2) Date: Jul. 22, 2015

(87) PCT Pub. No.: WO2014/122118
PCT Pub. Date: Aug. 14, 2014

(65) Prior Publication Data
US 2015/0365158 A1 Dec. 17, 2015

Related U.S. Application Data

(60) Provisional application No. 61/760,912, filed on Feb. 5, 2013.

(51) Int. Cl.
| | |
|---|---|
| H04W 84/04 | (2009.01) |
| H04B 7/155 | (2006.01) |
| H04B 1/40 | (2015.01) |
| H04W 24/10 | (2009.01) |
| H04W 84/12 | (2009.01) |

(52) U.S. Cl.
CPC ........... *H04B 7/15542* (2013.01); *H04B 1/40* (2013.01); *H04W 24/10* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 6,505,255 B1 * | 1/2003 | Akatsu | H04L 12/66 370/351 |
| 7,020,106 B2 | 3/2006 | Barnard et al. | |
| 8,064,909 B2 * | 11/2011 | Spinelli | H04W 92/02 455/436 |
| 8,295,877 B2 * | 10/2012 | Hui | H04W 88/06 370/328 |
| 8,817,760 B2 | 8/2014 | Moeller et al. | |
| 8,873,545 B2 | 10/2014 | Ozawa et al. | |
| 9,236,925 B2 | 1/2016 | Lee et al. | |

(Continued)

FOREIGN PATENT DOCUMENTS

| | | |
|---|---|---|
| EP | 2365663 A1 | 9/2011 |
| JP | 2008142150 A | 6/2008 |
| WO | 2011085073 A1 | 7/2011 |

OTHER PUBLICATIONS

International Search Report with Written Opinion of PCT/EP2014/052126.

*Primary Examiner* — Willie J Daniel, Jr.
(74) *Attorney, Agent, or Firm* — Maschoff Brennan

(57) ABSTRACT

According to an embodiment, a mobile extender (82) is provided which may be configured to provide a base unit (81) with an additional uplink via a mobile network like LTE.

17 Claims, 8 Drawing Sheets

(56) References Cited

U.S. PATENT DOCUMENTS

2004/0172658 A1* 9/2004 Rakib .............. G08B 13/19656
                                                725/120
2010/0144337 A1  6/2010 Dean
2011/0134975 A1  6/2011 Ahrndt
2012/0052857 A1  3/2012 Kumar et al.
2013/0142059 A1* 6/2013 Di Girolamo .......... H04L 12/66
                                                370/252

* cited by examiner

Peak time load balancing

SYSTEM, METHOD AND APPARATUS FOR AN UPLINK EXTENDER

CROSS-REFERENCE TO RELATED APPLICATIONS

This application is a national stage entry of PCT/EP2014/052126 having an international application date of Feb. 4, 2014 and being entitled "System, Method and Apparatus for an Uplink Extender", which application claims priority of U.S. Application Ser. No. 61/760,912, filed Feb. 5, 2013, entitled, "System Method & Apparatus for a Dual LTE Uplink Extender". The entire disclosure of the prior application is considered part of the disclosure of this application and is hereby incorporated by reference.

TECHNICAL FIELD

The present application generally relates to systems using two different links to a provider network and in particular to an extender usable to provide an additional link to a provider network.

BACKGROUND

Digital Subscriber Line (DSL) technologies are widely used to provide broadband services like Internet to customers. While the bandwidth enabled by DSL communication has increased in the recent years due to development of new standards like VDSL2, which employ additional techniques like vectoring, in some cases the available bandwidth may still be insufficient.

On the other hand, the available bandwidth and data rates via mobile networks have also been steadily increasing from second generation networks (using for example GPRS) via third generation networks (using for example UMTS) up to fourth generation networks (using for example LTE standard).

Generally, it would be desirable to provide existing network connections, for example DSL connections, with additional capacitance.

SUMMARY

According to some embodiments, a mobile extender apparatus as defined in claim 1, a method as defined in claim 21 and a base unit as defined in claim 23 or 24 are provided. The dependent claims define further embodiments. It should be noted that features defined for the apparatus may also be applicable to the method or base unit and vice versa unless noted otherwise.

Furthermore, in other embodiments other features than in the above-described embodiments may be used.

DETAILED DESCRIPTION

Figure 1:
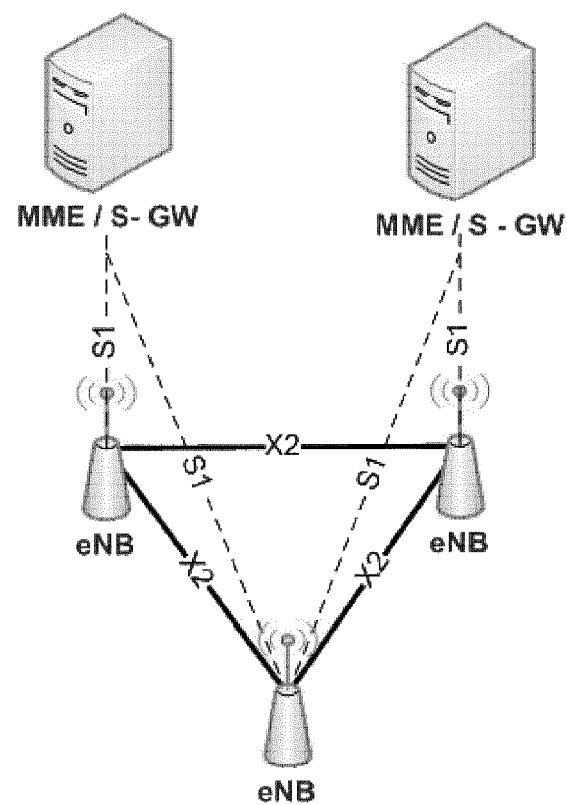
FIG. 1 is a schematic view of an LTE network architecture.

Embodiments will be described in detail with reference to the attached drawings. It is to be noted that these embodiments are not to be construed as limiting, but serve merely as examples. Features from different embodiments may be combined unless specifically noted otherwise. Furthermore, describing an embodiment with a plurality of features is not to be construed as indicating that all those features are necessary for implementing embodiments, as in other embodiments some of the described features may be omitted and/or replaced by alternative features. In other embodiments, additionally or alternatively additional features may be present.

Prior to describing embodiments in detail, some communication techniques usable in embodiments described thereafter will be explained in some more detail.

LTE (Long Term Evolution) is a standard for wireless data communications technology and an evolution of the GSM/UMTS standards. The goal of LTE is to increase the capacity and speed of wireless data networks using new DSP (digital signal processing) techniques and modulations that were developed around the turn of the millennium. A further goal is the redesign and simplification of the network architecture to an IP-based system with significantly reduced transfer latency compared to the 3G architecture. The LTE wireless interface is incompatible with 2G and 3G networks, so that it must be operated on a separate wireless spectrum.

The LTE specification provides downlink peak rates of 300 Mbit/s, uplink peak rates of 75 Mbit/s and QoS provisions permitting a transfer latency of less than 5 ms in the radio access network. LTE has the ability to manage fast-moving mobiles and supports multi-cast and broadcast streams. LTE supports scalable carrier bandwidths, from 1.4 MHz to 20 MHz and supports both frequency division duplexing (FDD) and time-division duplexing (TDD). The IP-based network architecture, called the Evolved Packet Core (EPC) and designed to replace the GPRS Core Network, supports seamless handovers for both voice and data to cell towers with older network technology such as GSM, UMTS and CDMA2000. The simpler architecture results in lower operating costs (for example, each E-UTRAN cell will support up to four times the data and voice capacity supported by HSPA).

Much of the LTE standard addresses the upgrading of 3G UMTS to what will eventually be 4G mobile communications technology. A large amount of the work is aimed at simplifying the architecture of the system, as it transits from the existing UMTS circuit+ packet switching combined network, to an all-IP flat architecture system. E-UTRA is the air interface of LTE. Its main features are:

Peak download rates up to 299.6 Mbit/s and upload rates up to 75.4 Mbit/s depending on the user equipment category (with 4×4 antennas using 20 MHz of spectrum). Five different terminal classes have been defined from a voice centric class up to a high end terminal that supports the peak data rates. All terminals will be able to process 20 MHz bandwidth.

Low data transfer latencies (sub-5 ms latency for small IP packets in optimal conditions), lower latencies for handover and connection setup time than with previous radio access technologies.

Improved support for mobility, exemplified by support for terminals moving at up to 350 km/h (220 mph) or 500 km/h (310 mph) depending on the frequency band.

OFDMA for the downlink, SC-FDMA for the uplink to conserve power

Support for both FDD and TDD communication systems as well as half-duplex FDD with the same radio access technology Support for all frequency bands currently used by IMT systems by ITU-R.

Increased spectrum flexibility: 1.4 MHz, 3 MHz, 5 MHz, 10 MHz, 15 MHz and 20 MHz wide cells are standardized. (W-CDMA requires 5 MHz slices, leading to some problems with roll-outs of the technology in countries where 5 MHz is a commonly allocated amount of spectrum, and is frequently already in use with legacy standards such as 2G GSM and cdmaOne.)

Support for cell sizes from tens of meters radius (femto and picocells) up to 100 km (62 miles) radius macrocells. In the lower frequency bands to be used in rural areas, 5 km (3.1 miles) is the optimal cell size, 30 km (19 miles) having reasonable performance, and up to 100 km cell sizes supported with acceptable performance. In city and urban areas, higher frequency bands (such as 2.6 GHz in EU) are used to support high speed mobile broadband. In this case, cell sizes may be 1 km (0.62 miles) or even less.

Supports at least 200 active data clients in every 5 MHz cell.

Simplified architecture: The network side of E-UTRAN is composed only of eNode Bs Support for inter-operation and co-existence with legacy standards (e.g. GSM/EDGE, UMTS and CDMA2000). Users can start a call or transfer of data in an area using an LTE standard, and, should coverage be unavailable, continue the operation without any action on their part using GSM/GPRS or W-CDMA-based UMTS or even 3GPP2 networks such as cdmaOne or CDMA2000)

Packet switched radio interface.

Support for MBSFN (Multicast-Broadcast Single Frequency Network). This feature can deliver services such as Mobile TV using the LTE infrastructure, and is a competitor for DVB-H-based TV broadcast.

Overview of the LTE Standard

The original study item on Long Term Evolution (LTE) of 3GPP Radio Access Technology was initiated with the aim to ensure that 3GPP RAT is competitive in the future (next 10 years). Focus of the study was on enhancement of the radio-access technology (UTRA) and optimization & simplification of radio access network (UTRAN). The key driving factors for LTE are:

Efficient spectrum utilization
Flexible spectrum allocation
Reduced cost for the operator
Improved system capacity and coverage
Higher data rate with reduced latency Targets for LTE Some specific targets set for LTE are listed below [3GPP TR 25.913]

Increased peak data rate: 100 Mbps for DL with 20 MHz (2 Rx Antenna at UE), 50 Mbps for UL with 20 MHz
Improved spectral efficiency: 5 bps/Hz for DL and 2.5 bps/Hz for UL
Improved cell edge performance (in terms of bit rate)
Reduced latency:

Overall Network Architecture

A schematic view of a simple example of the LTE network architecture is shown in FIG. 1.

Figure 2:
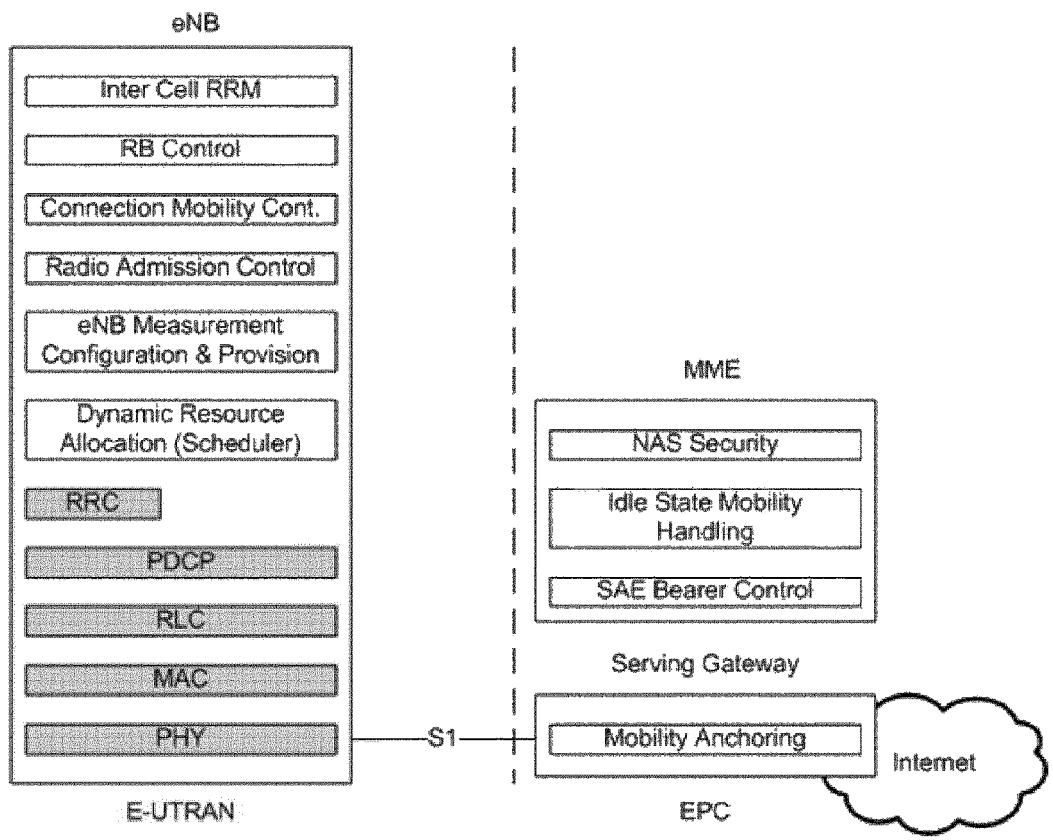
FIG. 2 is a block diagram showing components of different elements of FIG. 1.

The E-UTRAN uses a simplified single node architecture consisting of the eNBs (E-UTRAN Node B). The eNB communicates with the Evolved Packet Core (EPC) using the S1 interface; specifically with the MME (Mobility Management Entity) and the UPE (User Plane Entity) identified as S-GW (Serving Gateway) using S1-C and S1-U for control plane and user plane respectively. The MME and the UPE are preferably implemented as separate network nodes so as to facilitate independent scaling of the control and user plane. Also the eNB communicates with other eNB using the X2 interface (X2-C and X2-U for control and user plane respectively). Please refer to LTE Network Infrastructure and elements for a detailed overview of individual network elements. As an example, in FIG. 2 a block diagram showing some components of an eNB and an MME are shown.

Overall Architecture [Explained e.g. in 3GPP TS 36.300]

LTE supports an option of Multicast/Broadcast over a Single Frequency Network (MBSFN), where a common signal is transmitted from multiple cells with appropriate time synchronization. The eNB being the only entity of the E-UTRAN supports all the functions in a typical radio network such as Radio Bearer control, Mobility management, Admission control and scheduling. The Access Stratum resides completely at the eNB.

Functional Split Between E-UTRAN and EPC [Explained e.g. in 3GPP TS 36.300]

LTE Physical Layer

The LTE physical layer is based on Orthogonal Frequency Division Multiplexing scheme OFDM to meet the targets of high data rate and improved spectral efficiency. The spectral resources are allocated/used as a combination of both time (aka slot) and frequency units (aka subcarrier). MIMO options with 2 or 4 Antennas is supported. Multi-user MIMO is supported in both UL and DL. The modulation schemes supported in the downlink and uplink are QPSK, 16QAM and 64QAM.

Downlink (DL) Physical Channel

The downlink transmission uses the OFDM with cyclic prefix. Some of the reasons for using OFDM are given below:

Multiple carrier modulation (MCM) helps in countering the frequency selective fading as the channel appears to have nearly flat frequency response for the narrow band subcarrier.

The frequency range of the resource block and the number of resource blocks can be changed (or adapted to the channel condition) allowing flexible spectrum allocation.

Higher peak data rates can be achieved by using multiple resource blocks and not by reducing the symbol duration or using still higher order modulation thereby reducing the receiver complexity.

The multiple orthogonal subcarriers inherently provide higher spectral efficiency.

The cyclic prefix (CP) is the partial repetition of the bit/symbol sequence from the end to the beginning. This makes the time domain input sequence to appear periodic over a duration so that the DFT representation is possible for any frequency domain processing. Also the duration if chosen larger than the channel delay spread, will help in reducing the inter-symbol interference.

The following pilot signals are defined for the downlink physical layer:

Reference signal: The reference signal consists of known symbols transmitted at a well defined OFDM symbol position in the slot. This assists the receiver at the user terminal in estimating the channel impulse response so that channel distortion in the received signal can be compensated for. There is one reference signal transmitted per downlink antenna port and an exclusive symbol position is assigned for an antenna port (when one antenna port transmits a reference signal other ports are silent).

Synchronization signal: Primary and secondary synchronization signals are transmitted at a fixed subframes (first and sixth) position in a frame and assists in the cell search and synchronization process at the user terminal. Each cell is assigned unique Primary sync signal.

Uplink (UL) Physical Channel

The uplink transmission uses the SC-FDMA (Single Carrier FDMA) scheme. The SC-FDMA scheme is realized as a two stage process where the first stage transforms the input signal to frequency domain (represented by DFT coefficients) and the second stage converts these DFT coefficients to an OFDM signal using the OFDM scheme. Because of this association with OFDM, the SC-FDMA is also called as DFT-Spread OFDM. The reasons (in addition to those applicable for OFDM for downlink) for this choice are given below:

The two stage process allows selection of appropriate frequency range for the subcarriers while mapping the set of DFT coefficients to the Resource Blocks. Unique frequency can be allocated to different users at any given time so that there is no co-channel interference between users in the same cell. Also channels with significant co-channel interference can be avoided.

The transformation is equivalent to shift in the center frequency of the single carrier input signal. The subcarriers do not combine in random phases to cause large variation in the instantaneous power of the modulated signal. This means lower PAPR (Peak to Average Power Ratio).

The PAPR (Peak to Average Power Ratio) of SC-FDMA is lesser than that of the conventional OFDMA, so the RF power amplifier (PA) can be operated at a point nearer to recommended operating point. This increases the efficiency of a PA thereby reducing the power consumption at the user terminal.

The following pilot signals are defined for the uplink physical layer:

Demodulation Reference signal: This signal send by the user terminal along with the uplink transmission, assists the network in estimating the channel impulse response for the uplink bursts so as to effectively demodulate the uplink channel.

Sounding Reference Signal: This signal is sent by the user terminal assists the network in estimating the overall channel conditions and to allocate appropriate frequency resources for uplink transmission.

DSL

Digital subscriber line (DSL, originally digital subscriber loop) is a family of technologies that provide Internet access by transmitting digital data over the wires of a local telephone network. In telecommunications marketing, the term DSL is widely understood to mean asymmetric digital subscriber line (ADSL), the most commonly installed DSL technology although VDSL has been increasingly offered in recent years. DSL service is delivered simultaneously with wired telephone service on the same telephone line. This is possible because DSL uses higher frequency bands for data. On the customer premises, a DSL filter on each non-DSL outlet blocks any high frequency interference, to enable simultaneous use of the voice and DSL services.

DSL shall also be referred here as xDSL and includes all DSL standards, including ADSL, ADSL2+, VDSL, VDSL2 and G.Fast, which are incorporated herein for reference.

The bit rate of consumer DSL services typically ranges from 256 kbit/s to 40 Mbit/s in the direction to the customer (downstream), depending on DSL technology, line conditions, and service-level implementation. In ADSL, the data throughput in the upstream direction, (the direction to the service provider) is lower, hence the designation of asymmetric service. In symmetric digital subscriber line (SDSL) services, the downstream and upstream data rates are equal.

On the customer side, the DSL Transceiver, or ATU-R, or more commonly known as a DSL modem, is hooked up to a phone line. The telephone company (telco) connects the other end of the line to a DSLAM, which concentrates a large number of individual DSL connections into a single box. The location of the DSLAM depends on the telco, but it cannot be located too far from the user because of attenuation, the loss of data due to the large amount of electrical resistance encountered as the data moves between the DSLAM and the user's DSL modem. It is common for a few residential blocks to be connected to one DSLAM.

When the DSL modem powers up it goes through a sync procedure. The actual process varies from modem to modem but generally involves the following steps:

The DSL transceiver performs a self-test.

The DSL transceiver checks the connection between the DSL transceiver and the computer. For residential variations of DSL, this is usually the Ethernet (RJ-45) port or a USB port; in rare models, a FireWire port is used. Older DSL modems sported a native ATM interface (usually, a 25 Mbit/s serial interface). Also, some variations of DSL (such as SDSL) use synchronous serial connections.

The DSL transceiver then attempts to synchronize with the DSLAM. Data can only come into the computer when the DSLAM and the modem are synchronized. The synchronization process is relatively quick (in the range of seconds) but is very complex, involving extensive tests that allow both sides of the connection to optimize the performance according to the characteristics of the line in use. External, or stand-alone modem units have an indicator labeled "CD", "DSL", or "LINK", which can be used to tell if the modem is synchronized. During synchronization the light flashes; when synchronized, the light stays lit, usually with a green color.

Modern DSL gateways have more functionality and usually go through an initialization procedure very similar to a PC boot up. The system image is loaded from the flash memory; the system boots, synchronizes the DSL connection and establishes the IP connection between the local network and the service provider, using protocols such as DHCP or PPPoE. The system image can usually be updated to correct bugs, or to add new functionality.

Figure 3:
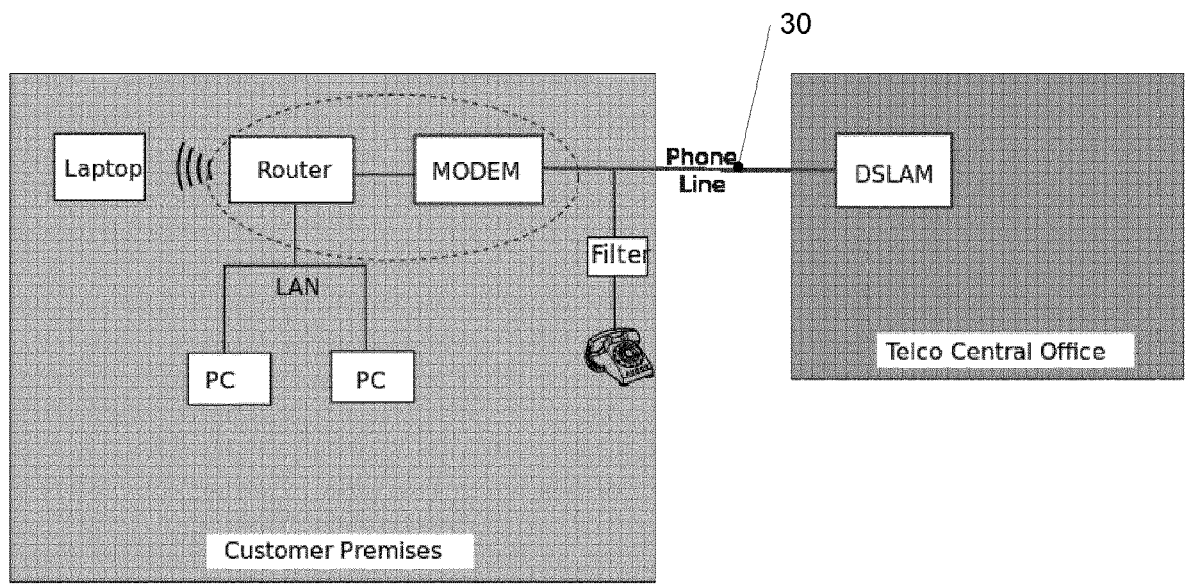
FIG. 3 shows a schematic diagram of an xDSL system.

The accompanying FIG. 3 is a schematic of a simple DSL connection 30. The right side shows a DSLAM residing e.g. in the telephone company's central office. The left side shows the customer premises equipment with an optional router. This router manages a local area network (LAN) off of which are connected some number of PCs. With many service providers, the customer may opt for a modem which contains a wireless router. This option (within the dashed bubble) often simplifies the connection.

Customer Premises Equipment

The customer end of the connection consists of a terminal adaptor or "DSL modem". This converts data between the digital signals used by computers and the voltage signal of a suitable frequency range which is then applied to the phone line.

Customer premises refers to equipment on the other end of the remote phone or twisted pair cable from the central office.

DSL Modem Schematic

In some DSL variations (for example, HDSL), the terminal adapter connects directly to the computer via a serial interface, using protocols such as Ethernet or V.35. In other cases (particularly ADSL), it is common for the customer equipment to be integrated with higher level functionality, such as routing, firewalling, or other application-specific hardware and software. In this case, the equipment is referred to as a gateway.

Figure 4:
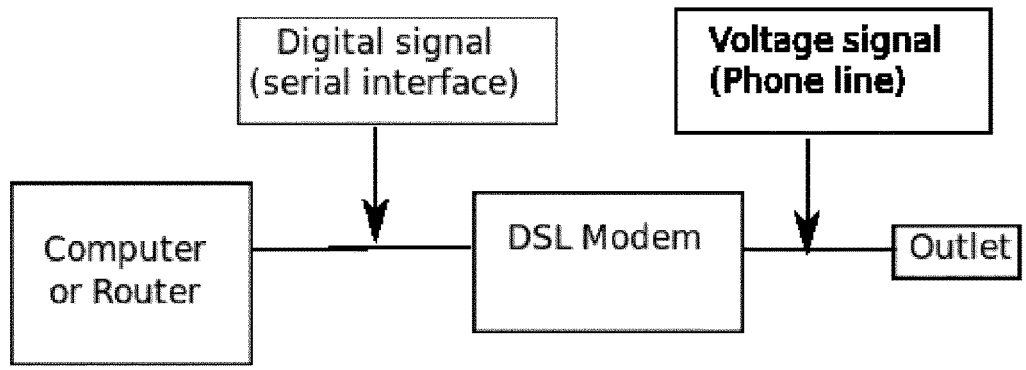
FIG. 4 shows a further diagram of an xDSL system.

Most DSL technologies require installation of appropriate filters to separate, or "split", the DSL signal from the low frequency voice signal. The separation can take place either at the demarcation point, or with filters installed at the telephone outlets inside the customer premises. Either way has its practical and economical limitations. To give an example, FIG. 4 schematically shows a DSL modem connecting between a digital signal and a voltage signal e.g. on a phone line.

A digital subscriber line access multiplexer (DSLAM, often pronounced dee-slam) is a network device, often located in the telephone exchanges of the telecommunications operators. It connects multiple customer digital subscriber line (DSL) interfaces to a high-speed digital communications channel using multiplexing techniques.

The DSLAM equipment collects the data from its many modem ports and aggregates their voice and data traffic into one complex composite "signal" via multiplexing. Depending on its device architecture and setup, a DSLAM aggregates the DSL lines over its Asynchronous Transfer Mode (ATM), frame relay, and/or Internet Protocol network (i.e., an IP-DSLAM using PTM-TC [Packet Transfer Mode-Transmission Convergence]) protocol (s) stack.

The aggregated traffic is then directed to a telco's backbone switch, via an access network (AN) also called a Network Service Provider (NSP) at up to 10 Gbit/s data rates.

The DSLAM acts like a network switch since its functionality is at Layer 2 of the OSI model. Therefore it cannot re-route traffic between multiple IP networks, only between ISP devices and end-user connection points. The DSLAM traffic is switched to a Broadband Remote Access Server where the end user traffic is then routed across the ISP network to the Internet. Customer-premises equipment that interfaces well with the DSLAM to which it is connected may take advantage of enhanced telephone voice and data line signaling features and the bandwidth monitoring and compensation capabilities it supports.

A DSLAM may or may not be located in the telephone exchange, and may also serve multiple data and voice customers within a neighborhood serving area interface, sometimes in conjunction with a digital loop carrier. DSLAMs are also used by hotels, lodges, residential neighborhoods, and other businesses operating their own private telephone exchange.

In addition to being a data switch and multiplexer, a DSLAM is also a large collection of modems. Each modem on the aggregation card communicates with a single subscriber's DSL modem. This modem functionality is integrated into the DSLAM itself instead of being done via an external device like a traditional computer modem.

Like traditional voice-band modems, a DSLAM's integrated DSL modems usually have the ability to probe the line and to adjust themselves to electronically or digitally compensate for forward echoes and other bandwidth-limiting factors in order to move data at the maximum connection rate capability of the subscriber's physical line.

This compensation capability also takes advantage of the better performance of "balanced line" DSL connections, providing capabilities for LAN segments longer than physically similar unshielded twisted pair (UTP) Ethernet connections, since the balanced line type is generally required for its hardware to function correctly. This is due to the nominal line impedance (measured in Ohms but comprising both resistance and inductance) of balanced lines being somewhat lower than that of UTP, thus supporting 'weaker' signals (however the solid-state electronics required to construct such digital interfaces is more costly).

Figure 5:
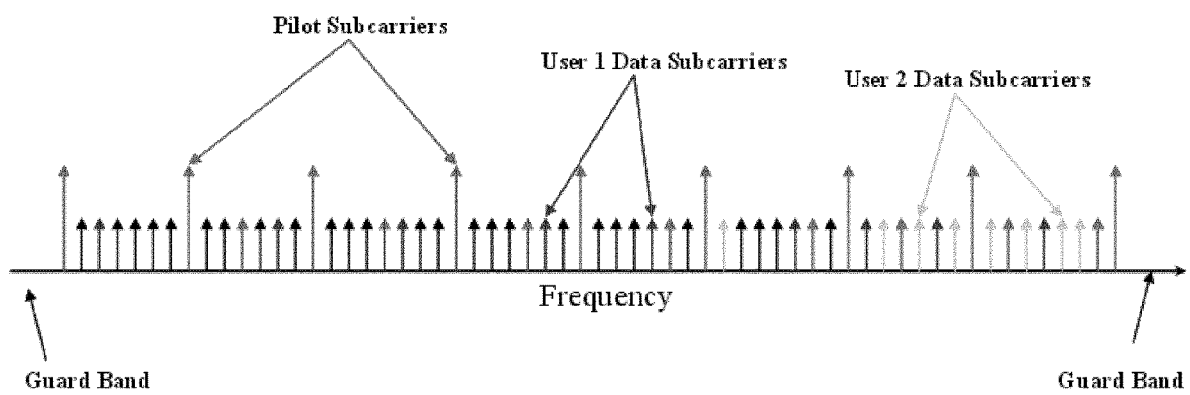
FIG. 5 is a diagram illustrating orthogonal frequency division multiple access.

Orthogonal Frequency-Division Multiple Access (OFDMA) is a multi-user version of the popular orthogonal frequency-division multiplexing (OFDM) digital modulation scheme. Multiple access is achieved in OFDMA by assigning subsets of subcarriers to individual users as shown in the illustration below. This allows simultaneous low data rate transmission from several users. FIG. 5 shows a schematic diagram illustrating the use of different subcarriers as pilot subcarriers, subcarriers assigned to a first user and subcarriers assigned to a second user.

Based on feedback information about the channel conditions, adaptive user-to-subcarrier assignment can be achieved. If the assignment is done sufficiently fast, this further improves the OFDM robustness to fast fading and narrow-band cochannel interference, and makes it possible to achieve even better system spectral efficiency.

Different numbers of sub-carriers can be assigned to different users, in view to support differentiated Quality of Service (QoS), i.e. to control the data rate and error probability individually for each user.

OFDMA resembles code division multiple access (CDMA) spread spectrum, where users can achieve different data rates by assigning a different code spreading factor or a different number of spreading codes to each user.

OFDMA can be seen as an alternative to combining OFDM with time division multiple access (TDMA) or time-domain statistical multiplexing, i.e. packet mode communication. Low-data-rate users can send continuously with low transmission power instead of using a "pulsed" high-power carrier. Constant delay, and shorter delay, can be achieved.

OFDMA can also be described as a combination of frequency domain and time domain multiple access, where the resources are partitioned in the time-frequency space, and slots are assigned along the OFDM symbol index as well as OFDM sub-carrier index.

OFDMA is considered as highly suitable for broadband wireless networks, due to advantages including scalability and MIMO-friendliness, and ability to take advantage of channel frequency selectivity.

In spectrum sensing cognitive radio, OFDMA is a possible approach to filling free radio frequency bands adaptively. Timo A. Weiss and Friedrich K. Jondral of the University of Karlsruhe proposed a spectrum pooling system in which free bands sensed by nodes were immediately filled by OFDMA subbands.

Figure 6:
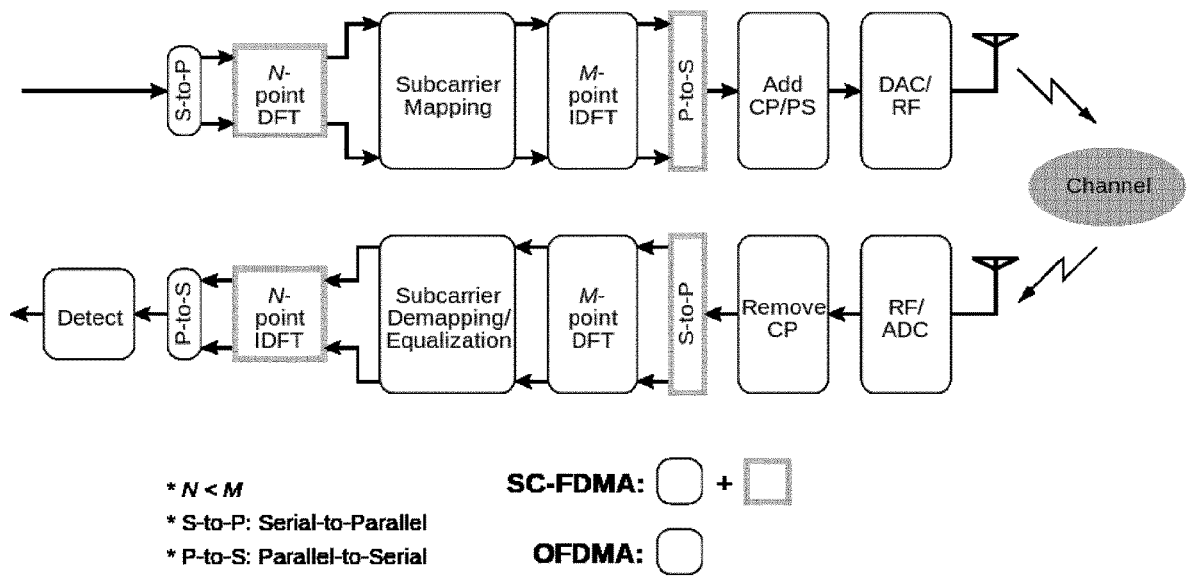
FIG. 6 shows a block diagram of a transceiver.

In FIG. 6, a schematic diagram of a SC-FDMA/OFDMA transceiver is shown for illustration purposes.

The present solutions according to embodiments provide a dual link for LTE and another communication protocol, e.g. DSL. Specifically, there is provided a combined 2 or more WAN uplink channel system. In a particular embodiment, there is provided a first link provided by a DSL channel and a second link provided by a mobile network protocol, such as LTE or future successor of LTE. In such an embodiment, for example a bandwidth provided by DSL may be enhanced by an additional uplink via LTE. Nevertheless, combinations of other proprietary technologies are considered, such LTE and GPON. The two or more channels are provided in parallel. Further, in embodiments, it is considered to provide the multi channel system on the CPE side, and further entirely on the CPE side without support or modification of the LTE network or network operator. This provide benefits in terms of bandwidth and extends options for the customer end.

Typically the network operator that provides the network is responsible for making modifications such as those needed to support such a multiple channel system. However, this is burdensome on the network operator, requires an infrastructure overhaul and therefore would be extremely expensive to implement. Some embodiments further contemplate providing the entire capability of a multi channel system from the CPE side. In one aspect, the network provides certain parameters that are used to form policies that are used on the CPE side. However, the provisioning of the multi channel system remains the responsibility of the CPE side.

Figure 7:
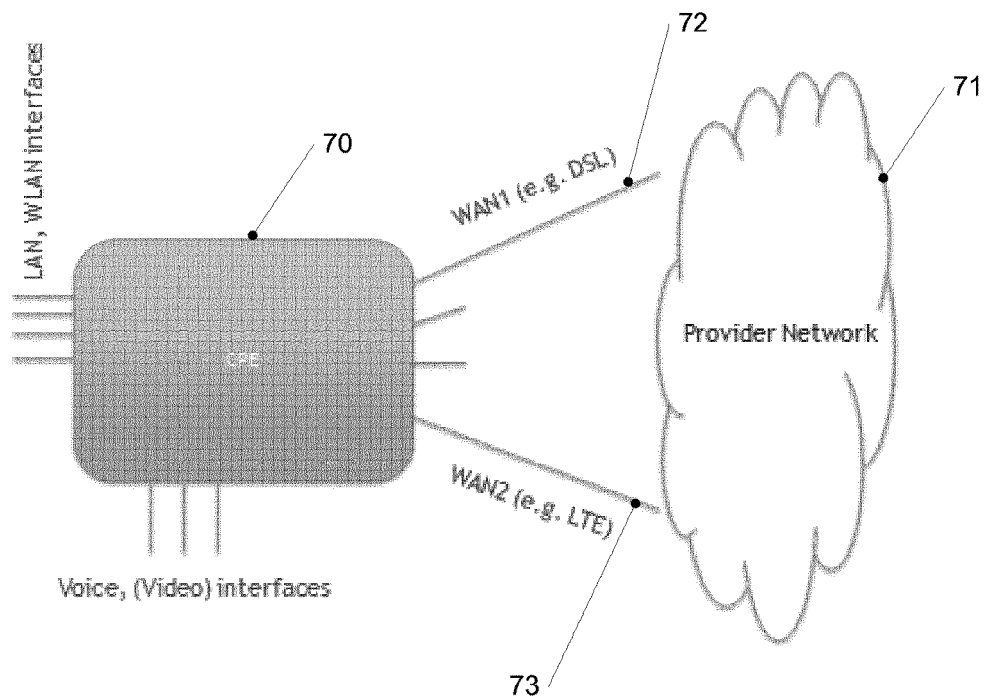
FIG. 7 shows a block diagram of a system according to an embodiment.

In one embodiment as shown in FIG. 7, the inventive solution according to an embodiment contemplates and provides for a complete solution for providing the multiple channel functionality in one CPE box 70. A box is considered to be a closed unit incorporating within a housing at least a modem. A box can be unitary or a transportable unit. This includes the policy setting for determining what loads or balances to apply to the different channels. It may also include modulating and/or demodulating the different protocols, and/or translating the signals from the different channels into another proprietary protocol. Box 70 communicates with a provider network 71 via a first link 72 (e.g. DSL) and a second link 73 (e.g. LTE).

Figure 8:
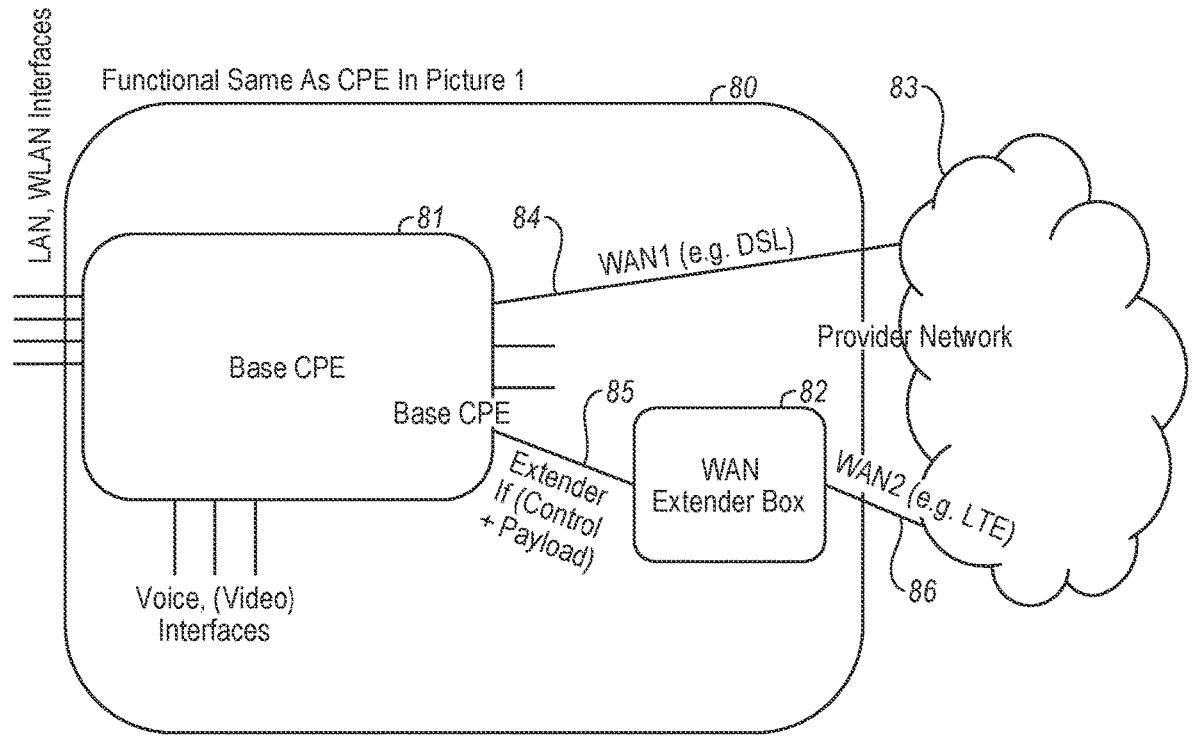
FIG. 8 shows a block diagram of a system according to a further embodiment.

In an alternative embodiment as shown in FIG. 8, it is contemplated to provide a partial solution in one or more CPE boxes 81 and provides a remote portion as an extender unit 82 that provides one or more link capabilities to connect to a proprietary protocol. In the figure below it is shown that the CPE box 81 (in the box with rounded edges) is a separate unit, that is physically separate or remote from the extender 82.

Extender 82 may be linked to CPE box 81 via any suitable protocol, for example via a USB connection or an Ethernet connection or also a wireless connection. CPE box 82 communicates via a first link (for example including an uplink direction) 84, for example a DSL link, with a provider network 83. Furthermore, via extender 82 a further link 86 to provide a network 83 is provided, for example an LTE link. As indicated by a box 80, CPE box 81 and extender 82 together provide essentially the same functionality as CPE box 70 of FIG. 7.

The extender (e.g. extender 82) in one embodiment provides a fundamental piece of the dual or multi channel system by providing the functionality required to connect and/or communicate with the target protocol. For example, FIG. 8 shows the extender providing connection to an LTE network. The functionality provided includes for example an LTE transceiver and a demodulator/modulator. In a further functionality, the extender provides bi-directional communication with the LTE network.

Therefore, the point considered in the embodiment of FIG. 8 is to not have all functionality to connect to multiple channels or protocols physically in one IP box. This has several benefits. For one, this allows current DSL OEMs to provide legacy boxes which can be modified with minimal programming to provide a box like box 81 of FIG. 8. It also allows OEMs to provide boxes that are pre-equipped to support and detect external linkages or extenders without having to expensively change the internal hardware of the box. The latter would require every customer of the network to upgrade to a new box, which requires customers to pay for additional equipment or more expensive equipment and leads to customer satisfaction. Further, customers are shown to switch to other networks when technology or equipment upgrades are required. Because of this last characteristic of customers, OEMs and networks prefer to make the least changes from the customer or user perspective in order to prevent customers from migrating to competitors.

The extender like extender 82 is provided in one embodiment as a WAN extender and in another further variation as a WLAN extender. Typically, the main box or gateway to the home, residence or office is placed near the telephone or DSL or cable or optic connection to the building. In many instances and in metropolitan areas, the main box is located therefore in the basement of the building. However, mobile signal strength and quality is typically poorer in subterranean areas. This makes it extremely inconvenient and in fact impossible in some instances to supplement a box with LTE. In an apartment building for example, a main router would be impossible to implement an LTE linkage in the basement. Extender 82 may comprise a transceiver for receiving a mobile signal (LTE in FIG. 8), a translator that translates the mobile signal into another protocol used on connection 85, and a transceiver that modulates and transmits the translated signal via connection 85 to box 81.

Turning to another embodiment of the inventive solution, there is provided a central gateway that provides one or more customers, which may be situated in a central or main location such as a basement, and the ability to traffic multiple LTE links coupled thereto. For example, the main box is provisioned to handle traffic from different LTE links. This may be done by providing different vendor names to each extender. Thus, each customer in the building desiring to couple LTE and extend their bandwidth need only purchase an extender and plug it in at their home, residence or apartment.

Returning now to the concept of the extender being placeable in a location remote from the main box, this allows the LTE extender to be positioned in a location that is more suitable or most suitable to receive mobile signals in terms of strength or quality. This greatly benefits the customer as it is truly plug and play and the user need not worry about connecting the unit to the main box or gateway. This also greatly benefits the network operator because the operator need not send out maintenance crew to upgrade or install the mobile uplink. In addition to the other mentioned benefits, the extender offers a great savings for all parties.

In order to connect the extender to the main box, it is contemplated that the extender can be coupled by any known or future known means, including through wireless, WLAN, power line, optics, cable, telephone, etc. In one aspect, an embodiment contemplates providing a WLAN connection, and in one aspect provides a WLAN transceiver within the extender unit. The bandwidth of the extender unit is contemplated to be, for example, at 5 GHz. With the powerline connection, the user simply plugs the extender into the wall and the unit is both powered by the power outlet and is coupled to the main box. In that case, the extender includes a powerline transceiver. For that matter, whichever communication method is chosen to communicate with the main box, a compatible transceiver and/or modulator/demodulator may be provided.

Figure 9A:
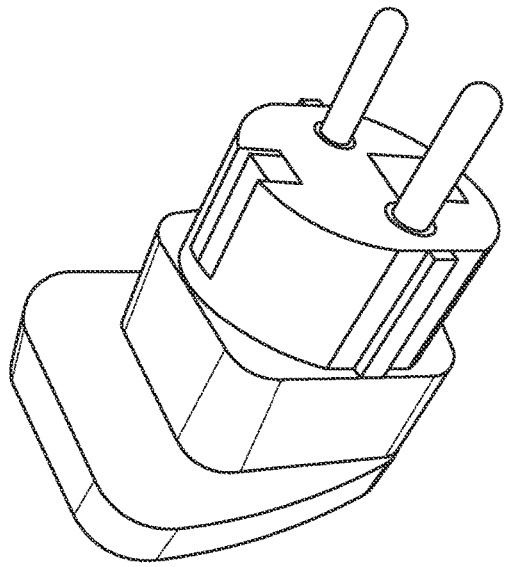
FIGS. 9A and 9B show perspective views of extenders according to embodiments.
Figure 9B:
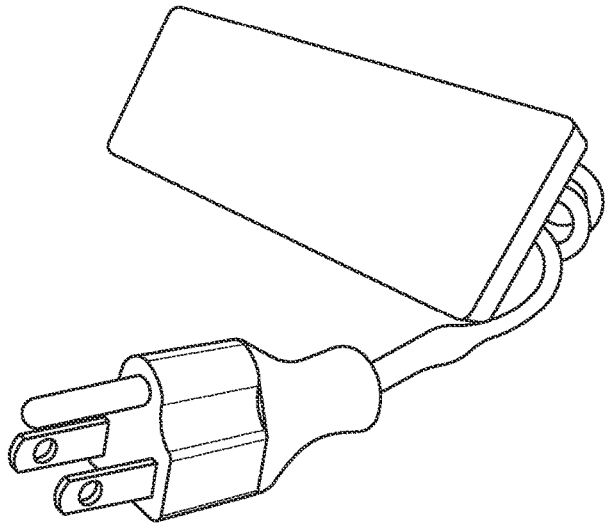

The extender itself in an embodiment is a unitary device, i.e., stand alone unit, such as a simple box with a housing. The housing may be fashioned of any suitable or aesthetic form that is suitable for the home, residence or office, such as a fire alarm, telephone, light switch, or any box mounted or unmounted on a wall or other fixture. As shown in the figure below the extender looks like a power adapter unit that plugs into a power outlet. As discussed, the power outlet may provide the connection to the main box through, for example, powerline communication protocols. In another variation, the extender includes a wireless or WLAN transceiver to communicate with the main box. Of course, the extender may be power by battery or a PC and may take the form of a USB stick and be powered by the USB port power pin. Examples are shown in FIGS. 9A and 9B.

Now the provisioning of the extender shall be discussed. It was already mentioned that the main box could be relatively easily modified. This can be performed remotely by the user and in software or firmware by uploading a plug in or other patch from a source on, for example, a qualified provider site. The extender alternatively or in addition to may have software that is uploaded to the unit. In the latter case, the extender may be connected to a PC or PC laptop. In that case, installation software may be provided to guide the user in installing the new software.

In another embodiment of the figure above, there is provided an indicator such as lights or LEDs that indicate signal strength or signal quality of the mobile signal or LTE signal. The indicator is in one arrangement provided on the extender housing for easy observance by the user. The user can then move around the house, residence or office and locate the best place or places to locate the and position the extender. For full mobility the battery or PC powered extender would allow the user to move freely about the space to locate the best signal location. A detector is further provided that detects the signal strength or quality of the signal. One skilled in the art understands how to implement a detector to detect the signal strength of a mobile signal.

Turning now to the CPE box or main box detection of the extender, the main box detects the presence of the extender. In one aspect the extender emits a signal, wirelessly or powerline or other and the emitted signal is received. The signal emitted may include, for example, a beacon signal such as a 802.11 WLAN beacon and may also include an ID of the extender. The main box may also be provisioned with an auto detection mechanism. That is, the main box automatically senses the emitted signal and initiates connection procedures to connect to the extender. In WLAN these handshaking procedures are provided in the 802.11 standard.

The extender also is arranged to provide a point-to-point connection between the extender and the main box. The transmission means may be direct and need not be packeted. However, in one variant there is provided packeting the signals such as IP packets between the extender and the main box, i.e., using the already-mentioned protocols, for example, WLAN. The signals may be encapsulated by an encapsulator into packets.

In a further arrangement according to an embodiment the inventive solution provides a proprietary format or signaling between the extender and the main box. As already mentioned, the vendor ID of the extender may be considered one example of such a proprietary format or protocol. Thus, a point-to-point link between the main or base box and the extender is provided and together with the base box the extender provides a dual uplink bonded system. As mentioned, in one arrangement the main box and extender provide the dual link without the assistance of the network side, except perhaps that the network side provides some basic guidelines in terms of parameters so that certain policies may be implemented by the main box.

The main box or CPE base will provide the other leg of the dual uplink, in the example case this will be a DSL link. The main box will balance the load and employ an algorithm that may be based on policies to decide what balance between the links is to be used.

Next, with respect to FIGS. 10-13, various approaches to distributing data between two uplinks like the two uplinks discussed, for example a first DSL link and a second LTE link as shown in FIGS. 7 and 8, will be explained.

Figure 10:
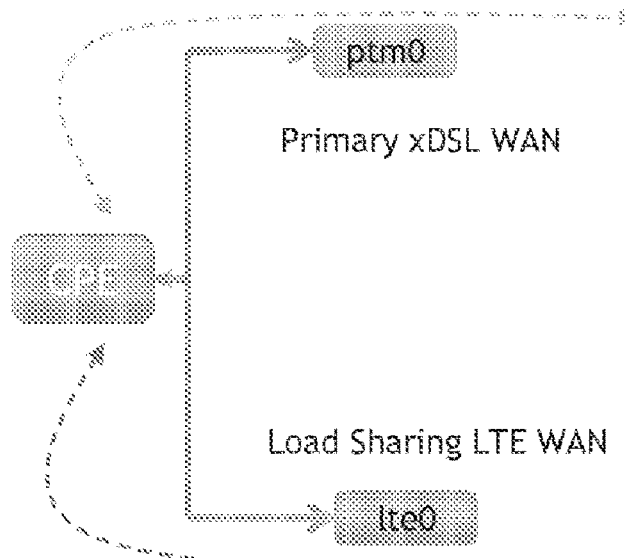
FIGS. 10-13 show diagrams illustrating various techniques for load balancing according to embodiments.

A first approach is shown in FIG. 10. Here, a DSL connection serves as the primary link where data is routed by default. Only when a load reaches peak values, for example near a maximum capacity of the xDSL link (for example 75%) the second link, for example LTE link, is activated for load sharing. As the first link is always active, this may lead to a guaranteed reliability in some embodiments. In some embodiments, such an approach may be attractive for the retail market, and DSL and LTE may be provided by different providers. Settings may be user controlled. Furthermore, this approach minimizes the LTE WAN usage (only activated on demand), which may lead to reduced costs. Furthermore, in such approaches in some cases the service provider infrastructure need not to be changed. On the other hand, it may be that the LTE WAN has to be brought up and brought down again for every spike in the DSL load. Furthermore, the network may be unaware of what is going on at the CPE with respect to loading and sharing of WANs, which may lead to remote troubleshooting issues. Furthermore, a load sharing between the two WANs may be not possible for all applications without network support, for example for voice over IP (VoIP) over LTE as an OTT service.

Figure 11:
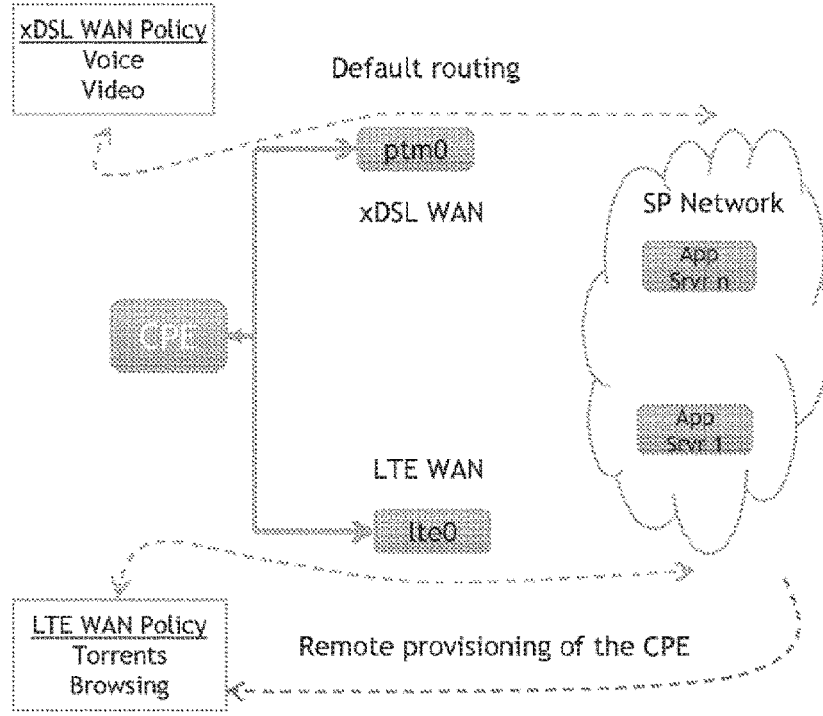

A further approach is shown in FIG. 11. In FIG. 11, traffic is sent in parallel over both WANs (for example xDSL link and LTE link). The distribution between the WANs may be policy based. In this case, both WANs are always active and used, and the policy determines to which WAN a session traffic is routed. In such an approach, also WAN reliability may be guaranteed in embodiments, and NetFilter/IProute2 may be used for policy configuration in some embodiments.

Such an approach in embodiments may be very easy to implement and work well even with a basic configuration. Furthermore, the policy configuration may be very flexible, for example 5 tuple based. In some embodiments, policy may be remotely provisioned, and the CPE may be in complete control of the service provider. Advanced concepts like session persistence may be added in the future. On the downside, minor upgrades may be required on the network side.

Figure 12:
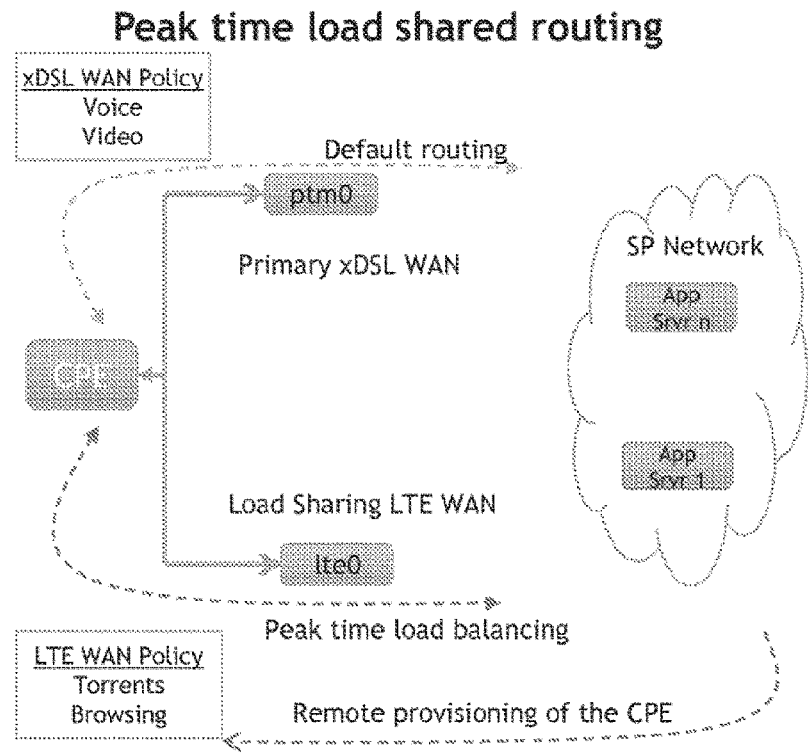

In FIG. 12, a combination of the approaches of FIGS. 10 and 11 is shown. In this approach of FIG. 12, the LTE WAN is activated based on demand, such that a load sharing with LTE only occurs when the xDSL WAN reaches a peek. When both WANs are activated, the distribution may be performed via a policy which determines to which WAN a session traffic is routed, similar to FIG. 11. Specific traffic types may be hardwired to a specific WAN. The policy may be remotely provisioned in embodiments. The WAN reliability may be guaranteed in embodiments. In such an embodiment, the usage of the LTE WAN may be minimized, which may help to reduce costs. Furthermore, the policy-based distribution in embodiments may ensure an optimal usage of WANs in service quality. The policies in embodiments may be remotely provisioned. In an embodiment, the CPE may be in complete control of the service provider. On the downside, similar to FIG. 10 the LTE WAN may have to be brought up and down for every spike in the xDSL load. Furthermore, similar to the approach of FIG. 11 minor upgrades may be required on the network side.

Figure 13:
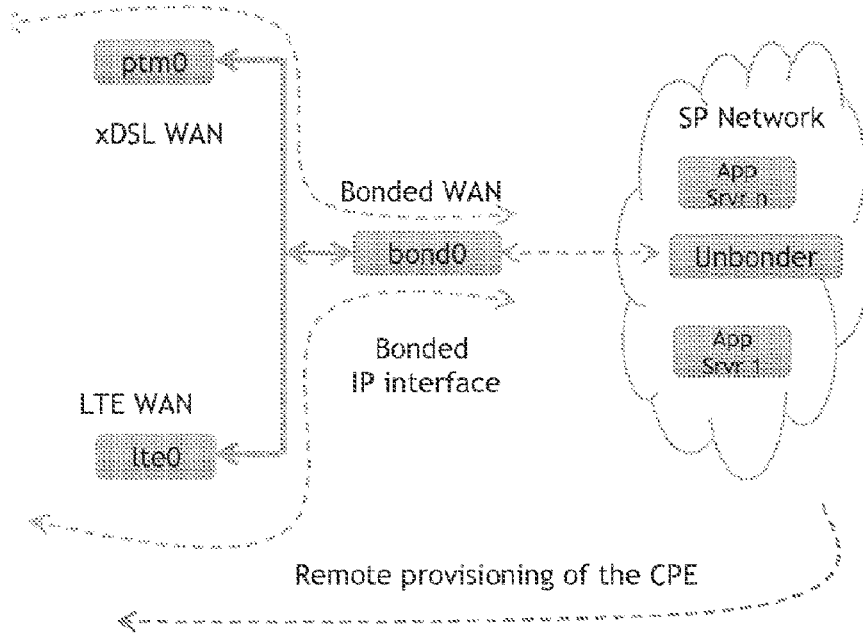

A further approach is shown in FIG. 13. Here, the two links are used as bonded links, and the traffic is sent in parallel over both WANs. Effectively, a single interface to the network is provided. However, on the network side a bonded IP interface has to be provided. Both WANs are always active and used, and session traffic is distributed across the WANs. The ratio of traffic distribution may be programmable. The WAN reliability may be guaranteed.

In this respect, both WANs are active and used, and if the traffic ratio is programmable this may offer a best possible user experience. In some cases, a minimal CPE user configuration may be needed. However, on the downside the bonding across a symmetric interface and different types of WANs could lead to unpredictable behavior and latencies. Furthermore, the service provider network has to be upgraded to support such a solution, for example bonded interfaces have to be provided on the network side. The deployment is rather complex. Furthermore, strategies for remote management of the CPU would have to be provided, which may be difficult to implement as different standards for DSL bonding and LTE-based provisioning exist.

Therefore, the approach of FIG. 13 may be comparatively complex to use, even if when deployed it may offer good performance.

While with respect to FIGS. 10-13 xDSL and LTE have been used as examples for different types of WANs, as already explained also other communication standards may be employed. Furthermore, more than two links may be provided.

Figure 14:
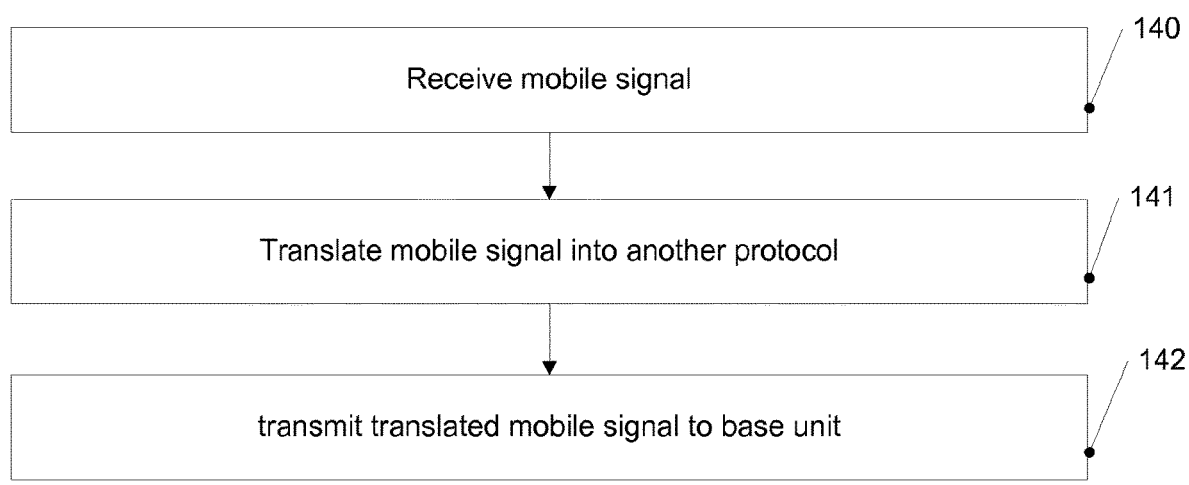
FIG. 14 is a flowchart illustrating a method according to an embodiment.

In FIG. 14, a flowchart illustrating a method according to an embodiment is shown. The method of FIG. 14 may for example be implemented in extender 82 of the embodiment of FIG. 8, but may also be used independently therefrom.

At 140, a mobile signal, i.e. a signal from a mobile network, is received. In some embodiments, the mobile signal may be an LTE signal.

At 141, the mobile signal is translated into another protocol, for example a protocol used on connection 85 of FIG. 8.

At 142, the translated signal is transmitted to a base unit, for example base unit 81 of FIG. 8.

As already mentioned, the embodiments shown serve only as examples.

The invention claimed is:

1. A mobile extender apparatus configured to couple to a base unit, wherein the base unit is configured to communicate directly via a first uplink to a communications network using a first protocol, the apparatus comprising:
    a first transceiver that receives a first mobile signal from the communications network and transmits a second mobile signal to the communications network via a second, different uplink to the communications network using a second protocol that is different than the first protocol,
    wherein the mobile extender apparatus forms, with the base unit, a dual uplink to the communications network, wherein each uplink employs a different protocol,
    a translator that translates the first mobile signal from the second protocol into third protocol that is different from the second protocol,
    a second transceiver that modulates and transmits the translated first mobile signal to the base unit according to the third protocol,
    wherein the mobile extender apparatus is physically separate from the base unit.

2. The apparatus of claim 1, wherein the mobile extender apparatus is a long term evolution (LTE) extender.

3. The apparatus of claim 1, further comprising an auto-detection to detect a signal emitted from the extender apparatus.

4. The apparatus of claim 1, further comprising an identification mechanism of the extender apparatus.

5. The apparatus of claim 1, wherein the extender apparatus is provided in a stand alone housing.

6. The apparatus of claim 1, further comprising a signal strength or quality indicator associated with the extender apparatus.

7. The apparatus of claim 1, further comprising a packet transmission mechanism associated with the extender apparatus.

8. The apparatus of claim 1, further comprising an encapsulator that encapsulates the signal emitted from the LTE extender.

9. The apparatus of claim 1, wherein the third protocol is a proprietary protocol used to communicate between the base unit and the extender apparatus.

10. The apparatus of claim 1, wherein the second transceiver is a WLAN transceiver.

11. The apparatus of claim 10, wherein the WLAN transceiver has a 5 GHz bandwidth.

12. The apparatus of claim 1, wherein the mobile extender apparatus forms a point to point link with the base unit.

13. The apparatus of claim 1, further comprising a software program on either the base unit or the mobile extender apparatus, wherein the software program is uploadable by a user of the mobile extender apparatus.

14. The apparatus of claim 1, wherein the base unit provides a DSL uplink as the first uplink, and wherein the second uplink via the mobile extender apparatus is used when the DSL uplink is at or near its maximum capacity.

15. The apparatus of claim 14,
    wherein use of the DSL uplink and uplink via the extender apparatus is governed by a policy.

16. A method to provide a dual link to a communication network, wherein a base unit has a first protocol and provides a first uplink to a communications network, the method comprising:
    receiving a first mobile signal at a mobile extender and transmitting a second mobile signal according to a second protocol via a second uplink to the communications network, wherein the first protocol and the second protocol are different,
    translating the first mobile signal from the second protocol into a third protocol that is different than the second protocol,
    transmitting the translated first mobile signal to the base unit, wherein the mobile extender is physically separate from the base unit, wherein the mobile extender comprises:
a first transceiver that receives the first mobile signal,
a translator that translates the first mobile signal into another protocol,
a second transceiver that modulates and transmits the translated first mobile signal to the base unit, and
wherein the mobile extender apparatus is configured to form a dual uplink to the network together with the base unit.

17. A mobile extender apparatus configured to couple to a base unit, wherein the base unit is configured to communicate directly via a first uplink to a communications network using a first protocol, the apparatus comprising:
a first transceiver that receives a first mobile signal from the communications network and transmits a second mobile signal to the communications network via a second, different uplink to the communications network using a second protocol that is different than the first protocol,
wherein the mobile extender apparatus forms, with the base unit, a dual uplink to the communications network, wherein each uplink employs a different protocol,
a translator that translates the first mobile signal into a third protocol that is different from the second protocol,
a second transceiver that modulates and transmits the translated mobile signal to the base unit, and
a software program on either the base unit or the mobile extender apparatus, wherein the software program is uploadable by a user of the mobile extender apparatus,
wherein the mobile extender apparatus is physically separate from the base unit.

\* \* \* \* \*